United States Patent
Park

(10) Patent No.: US 6,541,105 B1
(45) Date of Patent: Apr. 1, 2003

(54) ACOUSTICAL OPEN-CELL POLYLEFINS AND PROCESS FOR MAKING

(75) Inventor: Chung P. Park, Baden-Baden (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/744,895
(22) PCT Filed: Sep. 16, 1999
(86) PCT No.: PCT/US99/21569
§ 371 (c)(1), (2), (4) Date: Jan. 24, 2002
(87) PCT Pub. No.: WO00/15700
PCT Pub. Date: Mar. 23, 2000

(51) Int. Cl.$^7$ .............................. C08J 9/36; C08J 9/38
(52) U.S. Cl. ...................... 428/304.4; 429/500; 521/79; 521/81; 521/142; 521/143
(58) Field of Search ................. 521/142, 143, 521/79, 81; 428/304.4, 500

(56) References Cited

U.S. PATENT DOCUMENTS

| | | | |
|---|---|---|---|
| 3,239,585 A | 3/1966 | Karpovich et al. | 264/84 |
| 3,386,877 A | 6/1968 | Skochdopole et al. | 161/160 |
| 4,154,785 A | 5/1979 | Inui et al. | 264/45.5 |
| 4,226,946 A | 10/1980 | Park et al. | 521/98 |
| 4,384,032 A | 5/1983 | Tashiro et al. | 429/249 |
| 4,423,101 A | 12/1983 | Willstead | 428/76 |
| 4,435,346 A | 3/1984 | Ito et al. | 264/54 |
| 4,554,293 A | 11/1985 | Park | 521/81 |
| 4,581,383 A | 4/1986 | Park | 521/91 |
| 4,714,716 A | 12/1987 | Park | 521/80 |
| 4,916,198 A | 4/1990 | Scheve et al. | 526/351 |
| 5,116,881 A | 5/1992 | Park et al. | 521/143 |
| 5,242,634 A | 9/1993 | Matsumoto | 264/25 |
| 5,340,840 A * | 8/1994 | Park et al. | |
| 5,348,795 A | 9/1994 | Park | 428/220 |
| 5,424,016 A | 6/1995 | Kolosowski | 264/156 |
| 5,527,573 A | 6/1996 | Kolosowski | 428/314.8 |
| 5,567,742 A | 10/1996 | Park | 521/143 |
| 5,585,058 A | 12/1996 | Kolosowski | 264/156 |
| 5,605,936 A | 2/1997 | DeNicola, Jr. et al. | 521/50.5 |
| 5,618,853 A | 4/1997 | Vonken et al. | 521/60 |
| 5,776,390 A | 7/1998 | Fiddelaers et al. | 264/50 |
| 5,843,058 A | 12/1998 | Quist | 604/369 |
| 6,007,890 A | 12/1999 | DeBlander | 428/72 |
| 6,207,254 B1 | 3/2001 | Lee et al. | 428/159 |
| 6,251,319 B1 | 6/2001 | Tusim et al. | 264/45.9 |

FOREIGN PATENT DOCUMENTS

| | | | |
|---|---|---|---|
| DE | 3514817 | 10/1985 | C08J/9/38 |
| EP | 611795 | 8/1994 | C08J/9/18 |
| JP | 59-030871 | 2/1984 | C09D/05/12 |
| JP | 62-273826 | 11/1987 | B29C/59/02 |
| JP | 02-188233 | 7/1990 | B29C/67/20 |
| JP | 08-231747 | 9/1996 | C08J/3/22 |
| WO | WO 84/00901 | 3/1984 | B01D/39/00 |

OTHER PUBLICATIONS

Dow Deutschland Product Information sheet for GREY-FOAM polyethylene foam plank published Apr. 1998.

Illbruck Foam Technology (now known as Illbruck Construction Technology Corporation of Leverkusen, Germany) trade bulletin on "ILLSONIC waterproof" sound absorbing sheet material published circa 1972 [as published in German together with an English translation of the same].

* cited by examiner

Primary Examiner—Morton Foelak

(57) ABSTRACT

This invention provides an expanded open-cell foam polymer composition comprising at least one linear or modified linear polyolefin, at least 50% of the cells being open, and the cells having an average size of at least 1 millimeter. It is desirable that the composition have a sound absorption coefficient as determined by ASTM D 1050 at 1,000 Hz which is greater than 0.15. In preferred foams the composition has an airflow resistivity of less than about 800,000 Rayls/m.

30 Claims, 4 Drawing Sheets

—◇— 4.4 mm sheet perforated
—♦— 4.4 mm sheet as extruded

—□— 10 mm sheet perforated
—■— 10 mm sheet as extruded

ACOUSTICAL OPEN-CELL POLYLEFINS AND PROCESS FOR MAKING

FIELD OF THE INVENTION

This invention relates to the field of foam materials suitable for sound absorption in automotive and appliance applications.

BACKGROUND OF THE INVENTION

Materials which are currently used for sound absorption applications in automobiles and appliances have one or more deficiencies. For example, open-cell polyurethane foams and melamine foams are thermoset materials, that is, cross-linked polymers, which are not easily recyclable. In addition, polyurethane and melamine foams lack hydrolytic stability for long term use in contact with water or in a humid environment.

Shoddies are relatively inexpensive fibrous pads, typically made from recycled scrap material by shredding and needling thermoplastic and/or thermoset materials. Although shoddies typically have good sound absorbing properties, they are relatively dense, and add significantly to the weight of a car or an appliance. Further, fibrous materials lack structural integrity and are often difficult to handle.

Open-cell polyolefin foams which are currently available commercially are not well suited for sound absorption. For example, a commercially available open-cell polyolefin foam made from cross-linked polyethylene, which is produced by a compression molding process, has been found unsuitable for sound absorption according to an industry source. It is believed that the pores in this foam are too small to permit an adequate flow of air, which in turn results in poor sound absorption properties.

Therefore, it would be desirable to have an open-cell, low density, recyclable thermoplastic foam exhibiting excellent sound absorption properties for use in automotive and appliance applications. In particular, it would be desirable to provide a polyolefin foam which is substantially non-cross-linked or lightly cross-linked, and which has sufficient open-cells and a sufficient cell size to exhibit high porosity and hence excellent sound absorption properties.

SUMMARY OF THE INVENTION

This invention provides an expanded open-cell foam polymer composition comprising at least one linear or modified linear polyolefin, at least 50% of the cells being open, and the cells having an average size of at least 1 millimeter. It is desirable that the composition have a sound absorption coefficient as determined by ASTM D 1050 at 1,000 Hz which is greater than 0.15. In preferred foams the composition has an airflow resistivity of less than about 800,000 Rayls/m.

In another embodiment, this invention provides a sound insulation panel comprising two skin layers and a foam sheet disposed between the two skin layers, the foam sheet comprising an expanded open-cell polymer composition having a sound absorption coefficient as determined by ASTM D 1050 at 1,000 Hz which is greater than 0.15 comprising at least one linear or modified linear polyolefin, at least 50% of the cells being open, and the cells having an average size of at least 1 millimeter. Preferably, the composition has an airflow resistivity of less than about 800,000 Rayls/m.

In another embodiment, this invention provides a foam sheet comprising an open-cell polymer composition having a sound absorption coefficient as determined by ASTM D 1050 at 1,000 Hz which is greater than 0.15 comprising at least one linear or modified linear polyolefin, at least 50% of the cells being open, and the cells having an average size of at least 1 millimeter. Preferably, the composition has an airflow resistivity of less than about 800,000 Rayls/m.

The polymeric foam materials of this invention exhibit excellent sound-absorbing characteristics, excellent hydrolytic stability for long term use in contact with water and a humid environment, and have relatively low density, good structural integrity, and are easy to handle.

DESCRIPTION OF THE PREFERRED EMBODIMENTS

Figure 1:
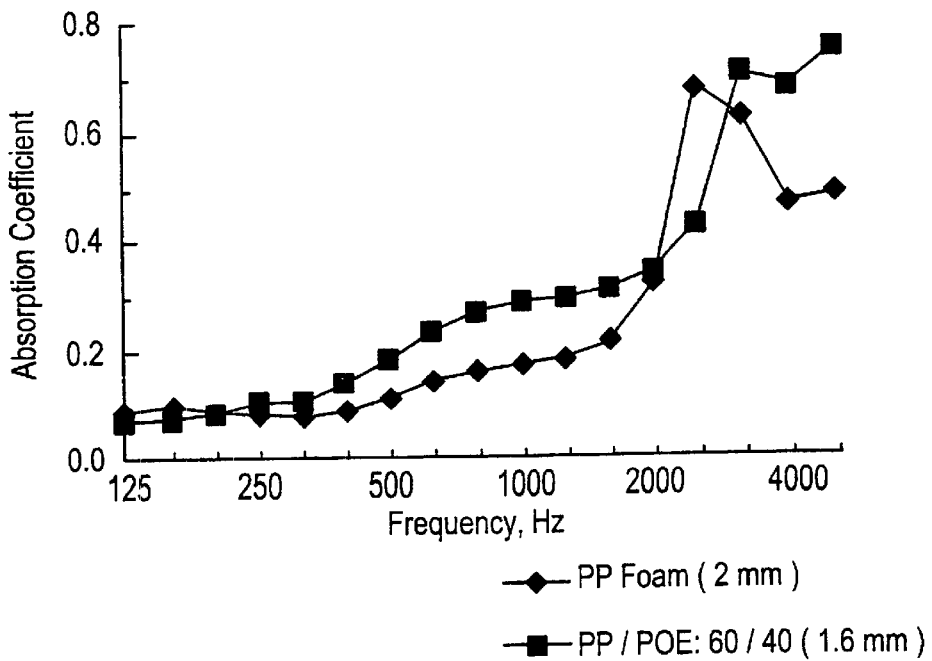
FIGS. 1–6 are graphs of absorption coefficient verses frequency for foam specimens in accordance with the invention, as well as comparative examples of foam specimens which are not in accordance with the invention.

Not all open-cell polyolefin foams are suitable for sound absorption. An open-cell foam having a relatively low air flow resistance has been known to be suitable for sound absorption. Low air flow resistance generally requires relatively large pores on the cell walls. In general, an open-cell foam having large pores on the cell walls is difficult to achieve from a conventional foam resin such as a low density branched polyethylene resin because the cells start to collapse as soon as holes develop in the cell walls during the process of manufacturing the resin foam. The literature does not provide guidance as to how such a foam material having suitably large pore openings can be produced from a polyolefin resin. It was discovered that a stable open-cell foam having relatively large cells and which absorbs sound well can be readily produced from a linear polyolefin composition. It is believed that the foam, owing to its relatively large cell windows, has relatively large pores developed therein. Suitable polyolefin resins for production of large-cell open-cell foam include, a linear polyolefin a modified linear polyolefin or a blend of a linear polyolefin or a modified linear polyolefin with another polyolefin which has a melting point which is at least about 10° C. less than that of the linear or modified linear polyolefin. In the case of a blend of a linear or modified linear polyolefin with a polyolefin having a melting point of at least about 10° C. less than the melting point of the linear or modified linear polyolefin, it is believed that the low-melting polymer provides initiation sites for cell wall opening, and keeps the cell walls in a fluid state longer, thereby facilitating formation of larger pores. In addition, it has been found that blending in a low-melting polyolefin elastomer in a polyolefin resin has been found to enhance the acoustic performance of the resulting foam material.

The foam materials of this invention are prepared from a polymer composition comprising at least one linear or modified linear polyolefin that is prepared using a Ziegler-Natta or metallocene catalyst. The linear or modified linear polyolefins can be homopolymers of $C_2$–$C_{20}$ olefins, such as ethylene, propylene, 4-methyl-1-pentene, etc., or they can be copolymers of ethylene with at least one $C_3$–$C_{20}$ α-olefin, or copolymers of propylene with ethylene and/or $C_4$–$C_{20}$ α-olefins. Preferred monomers include the $C_2$–$C_{10}$ α-olefins, especially ethylene, propylene, isobutylene, 1-butene, 1-hexene, 4-methyl-1-pentene and 1-octene. Among the polyolefin resins, a polypropylene homopolymer or an ethylene-propylene copolymer is preferred.

The expression "modified linear polyolefin" refers to a linear polyolefin which has been modified to have some long chain branching for foam expansion. A preferred modified linear polyolefin is high melt strength (HMS) polypropylene which may be prepared by irradiating a linear polypropylene. HMS-PP is described in U.S. Pat. No. 4,916,198, which is hereby incorporated by reference.

The linear or modified linear resin(s) can be blended with another polyolefin which has a lower melting point, preferably at least about 10° C. less than that of the linear or modified linear polyolefin. The lower melting polyoletin is preferably a substantially linear polyolefin prepared using a constrained geometry catalyst. Preferred substantially linear polyolefins are prepared using a constrained geometry catalyst as described in U.S. Pat. No. 5,272,236, the disclosure of which is incorporated herein by reference. The preferred substantially linear polyolefins are homopolymers and copolymers of ethylene with α-olefins or styrene and have a melt index (MI) of from about 0.01 grams per 10 minutes to about 1,000 grams per 10 minutes.

The expression "substantially linear polyolefin" means that the polymer backbone is either unsubstituted or substituted with up to 3 long chain branches per 1,000 carbons. Preferred polymers are substituted with about 0.01 long chain branches per 1,000 carbons to about 3 long chain branches per 1,000 carbons, more preferably from about 0.01 long chain branches per 1,000 carbons to about 1 long chain branch per 1,000 carbons, and especially from about 0.3 long chain branches per 1,000 carbons to about 1 long chain branch per 1,000 carbons.

Suitable substantially linear polyolefins include propylene homopolymers (polypropylene) and copolymers of propylene and copolymerizable ethylenically unsaturated comonomers. The propylene polymer material may further include non-propylenic polymers in small amounts. The propylene polymer material may be comprised solely of one or more propylene homopolymers, one or more propylene copolymers, a blend of one or more of each of propylene homopolymers and copolymers, or blends of any of the foregoing with a non-propylenic polymer. The propylene polymer material comprises greater than 50 weight percent and preferably greater than 70 weight percent of propylene monomeric units. Suitable mono-ethylenically unsaturated comonomers include α-olefins. The propylene copolymer most preferably comprises about 20 weight percent or less by weight of the ethylenically unsaturated comonomer, that is, greater than 80 weight percent propylene monomer.

Particularly useful propylene copolymers are those copolymers of propylene and one or more non-propylenic olefins. Propylene copolymers include random and block copolymers of propylene and an olefin selected from the group consisting of ethylene and, $C_4$–$C_{10}$ α-olefins. Propylene copolymers also include random terpolymers of propylene and α-olefins selected from the group consisting of ethylene and $C_4$–$C_8$ α-olefins. In terpolymers having both ethylene and $C_4$–$C_{10}$ α-olefins, the ethylene content is preferably 20% or less by weight. The $C_4$–$C_{10}$ α-olefins include linear and branched $C_4$–$C_{10}$ α-olefins such as, for example, 1-butene; isobutylene; 1-pentene; 3-methyl-1-butene; 1-hexene; 3,4-dimethyl-1-butene; 1-heptene; 3-methyl-1-hexene; and the like.

The polymer blends of this invention preferably comprise at least 50 weight percent of a linear or modified linear polyolefin, and more preferably at least 60 weight percent of a linear or modified linear polyolefin based on the total polymer weight of the blend, with the balance preferably comprising another olefin polymer, most preferably a substantially linear polyolefin.

Other suitable polyolefins which can be blended with the linear or modified linear polyolefin include high, medium, and low density polyethylenes, polybutene-1, ethylene-acrylic acid copolymer, ethylene-vinyl acetate copolymer, ethylene-propylene rubber, styrene-butadiene rubber, ethylene-ethylacrylate copolymer, and the like.

It is desirable that the polyolefin foams of this invention be easily recyclable. Accordingly, the polymer composition used to prepare the sound absorbing foams of this invention are preferably free of cross-linkable polymers and/or cross-linking agents. The resulting acoustical foam material is preferably substantially non-crosslinked. The expression "non-crosslinked" is inclusive however, of a slight degree of cross-linking which may naturally occur without the use of cross-linking agents, and the expression "substantially non-crosslinked" encompasses lightly cross-linked polymers as described in U.S. Pat. No. 5,348,795, which is hereby incorporated by reference.

In preparing the sound absorbing foam materials of this invention, a linear or modified linear polyolefin resin or a resin blend comprising a linear or modified linear polyolefin resin is melt processed in a conventional manner by feeding, melting, and metering it in a conventional melt processing apparatus such as an extruder. A blowing agent is mixed into the polymer resin or polymer resin blend under pressure to form a flowable gel or admixture. As the flowable gel or admixture is extruded through a die opening in the extruder to a zone of lower pressure, the blowing agent activates to expand the polymer blend to a foam structure. Foams having a density of less than 160 kilograms per cubic meter, more preferably less than 80 kilograms per cubic meter, and most preferably less than 40 kilograms per cubic meter may be produced. The foams have an open structure, wherein at least 50% of the cells are open. The average cell size is from about 1 millimeter to about 8 millimeters, and more preferably from about 1.5 millimeter to about 5 millimeters.

The blowing agents which may be used can be physical blowing agents or chemical blowing agents. However, physical blowing agents are preferred. Examples of physical blowing agents include aliphatic hydrocarbons having 1–9 carbon atoms, halogenated aliphatic hydrocarbons having 1–4 carbon atoms, and aliphatic alcohols having 1–3 carbon atoms. Aliphatic hydrocarbons include methane, ethane, propane, n-butane, isobutane, n-pentane, isopentane, neopentane, and the like. Among halogenated hydrocarbons, fluorinated hydrocarbons are preferred. Examples of fluorinated hydrocarbons include methyl fluoride; perfluoromethane; ethyl fluoride; 1,1-difluoroethane (HFC-152a); 1,1,1-trifluoroethane (HFC-143a); 1,1,1,2-tetrafluoroethan (HFC-134a); pentafluoroethane; perfluoroethane; 2,2-difluoropropane; 1,1,1-trifluoropropane; perfluoropropane; perfluorobutane; and perfluorocyclobutane. Partially halogenated chlorocarbons and chlorofluorocarbons for use in this invention include methyl chloride; methylene chloride; ethyl chloride; 1,1,1-trichloroethane; 1,1-dichloro-1-fluoroethane (HCFC-141b); 1-chloro-1,1-difluoroethane (HCFC-142b); 1,1-dichloro-2,2,2-trifluoroethane (HCFC-123) and 1-chloro-1,2,2,2-tetrafluroethane (HCFC-124). Fully halogenated chlorofluorocarbons include trichloromonofluoromethane (CFC-11), dichlorodiflurormethane (CFC-12), trichlorotrifluoroethane (CFC-113), dichlorotetrafluoroethane (CFC-114), chloroheptafluoropropane and dichlorohexafluoropropane. Fully halogenated chlorofluorocarbons are not preferred due to their ozone depletion potential. Aliphatic alcohols include methanol, ethanol, n-propanol and isopropanol. A preferred organic blowing agent is a mixture of HCFC-142b and ethyl chloride.

The blowing agent may comprise in minor proportion (that is, less than 15 wt %) one or more inorganic blowing agents or chemical blowing agents. Suitable inorganic blowing agents useful in making the foams of the present invention include carbon dioxide, nitrogen, argon, water, air, nitrogen and helium. Chemical blowing agents include azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide, and trihydrazino triazine.

The amount of blowing agent incorporated into the polymer melt to make a foam-forming polymer gel is preferably from about 0.5 to about 5, and more preferably from about 0.8 to about 4 gram moles per kilograms of polymer.

Although substantially non-crosslinked foams are preferred, lightly cross-linked foams can be prepared in accordance with the invention. Such lightly cross-linked foams are not as easily recycled as the preferred substantially non-crosslinked foams, but otherwise have generally the same advantages, including low density, excellent sound absorbing properties, and good structural integrity. Such compositions will contain one or more cross-linkable polymers. The cross-linkable polymer may be a copolymer of an ethylenically unsaturated monomer or other olefinic monomer with an ethylenically unsaturated monomer having a carboxylic acid functional group, a hydroxyl group, or an amine or amide group. The monomers may be combined in the copolymer in any way, for example, as random copolymer, as block or sequential copolymers, or as graft copolymers. Materials of these kinds and methods of making them are readily known in the art. The cross-linkable polymer components of the blend are preferably copolymers of ethylene and acrylic acid. Cross-linking agents useful in preparing the cross-linked foams include epoxy and amino functional silanes, organofunctional alkoxy silanes, multi-epoxy functional resins, titanates, and amines. These cross-linking agents react with the cross-linkable polymer compound of the blend to form lightly cross-linked foam products. The light cross-linking of the polymer blend improves the melt strength and more easily allows successful foam extrusion on convention melt processing equipment.

It is preferable that the amount of cross-linkable polymer is less than 70%, more preferably less than 60%, and most preferably less than 50% of the weight of the resin blend.

Some of the cross-linking agents which may be used form cross-linking bonds by a reaction which releases alcohol. For example, alkoxy functional silane cross-linking agents graft on ethylenic polymers having carboxylic acid groups to form acyloxy silane linkages with the release of alcohol. Likewise, amino and epoxy functional silanes graft on polymers having carboxylic acid or anhydride groups, with the release of alcohol. The presence of alcohol in the foam extrusion line may be used to control the cross-linking reaction, effectively delaying cross-linking until the polymer blends exit the extrusion die.

The preferred silane cross-linking agents are organofunctional silanes of the general formula $RR'SiY_2$, where R represent an epoxy or amine functional radical attached to silicon through a silicon carbon bond and composed of carbon, hydrogen and optionally oxygen or nitrogen, Y represents a hydrolyzable organic radical, and R' represents a hydrocarbon radical. Alternatively, the silane may be an alkoxy silane of the general formula $R_aSi(OR')_b$, where "a" is one or two and "b" is two or three, R is a methyl group or an organoreactive alkyl group, and OR' is a hydrolyzable alkoxy group.

Preferred multi-epoxy functional resins include an epoxy novolac resin, such as D.E.N. 431, commercially available from Dow Chemical Company. Such multi-epoxy functional resins have multiple epoxy functional reaction sites which will react with carboxylic acid functional groups on the cross-linkable polymer.

The preferred titanate cross-linking agents are titanium alkoxides of the general formula $Ti(OR)_4$, where R is an alkyl group of from 1 to 18 carbon atoms, or titanium coupling agents of the general formula $(RO)_mTi(O-X-R_2-Y)_n$, where R is an alkyl group, X is carbonyl, $R_2$ is a long chain of carbon atoms, Y is a reactive double bond or an amino group, and "m" and "n" are integers which total 4. The most preferred titanate coupling agents are titanium isopropoxide and tetramethyl titanate. The titanate cross-linking agents react with carboxylic acid or hydroxyl functional groups on the cross-linkable polymer releasing alcohols.

Preferred amino cross-linking agents are hexamethoxymethylmelamine (HMMM) and alkylated glycolurilformaldehyde resins. The amino cross-linking agents react with hydroxyl, carboxylic acid or amide functional groups on the cross-linkable polymer.

The cross-linking agents are added to the polymer gel blend with a blowing agent and react with the cross-linkable polymer component of the blend. Cross-linking increases the melt tension and melt viscosity of the gel, while permitting the polymer to remain flowable. Some of the cross-linking agents used form alcohols as the result of the cross-linking reaction and act to limit the degree of cross-linking. However, in such instances the cross-linking reaction proceeds during foam expansion at the exit of the die as the alcohol diffuses into the gaseous phase with the volatile blowing agent. Optionally, an alcohol may be added to the blowing agent to control further the cross-linking reaction. Preferably, such alcohols are of low molecular weight, having from 1 to about 4 carbon atoms, such as methanol, ethanol, isopropanol and butanol.

Cross-linked polymers which may be used in this invention may also be prepared by the use of a free-radical generating compound. For example, a linear low density polyethylene resin can be lightly cross-linked using an organic peroxide such as dicumyl peroxide, and a polypropylene resin can be cross-linked using a multi-azidofunctional compound.

The foam products of this invention can be produced on conventional melt processing apparatus such as by continuous extrusion from a screw-type extruder. Such an extruder typically comprises a series of sequential zones including a feed zone, compression and melt zone, metering zone, and mixing zone. The barrel of the extruder may be provided with conventional electric heaters for zoned temperature control.

An inlet is provided for adding a mixture of fluid blowing agent and optionally cross-linking agent under pressure to the polymer blend in the extruder barrel between the metering and mixing zones. Optionally cross-linking agent is pumped, in a controlled manner, into the stream of fluid blowing agent upstream of the injection nozzle. The blowing agent and optional cross-linking agent are compounded into the starting polymer in a conventional manner to form a flowable gel or admixture, preferably in a continuous manner. Thus, the polymer blend, blowing agent, and optional cross-linking agent may be combined in the mixing zone of an extruder using heat to plastify the polymer resin, pressure to maintain the blowing agent in a liquid state, and mechanical work to obtain thorough mixing.

The discharge end of the mixing zone of the extruder is connected, through a cooling and temperature control zone, to a die orifice. The hot polymer gel is cooled and then passed through the die orifice into a zone of low pressure (for example, normal ambient air pressure) where the blowing agent is activated and the polymer gel expands to a lower density, cellular mass. As the foamed extrusion forms, it is conducted away from the die and allowed to cool and harden. The foamed extrusions may be formed as planks, tubes or sheets.

As is conventional, finely divided solid materials, such as talc, calcium silicate, zinc stearate, and the like, can advantageously be incorporated with the polymer gel prior to expansion. Such finely divided materials aid in controlling the size of the cells and may be employed in amounts up to 5% by weight of the polymer. Numerous fillers, pigments, lubricants, anti-oxidants and the like, well known in the art, can be incorporated as desired.

In accordance with a preferred aspect of the invention, the foam may be softened and more open cells developed by mechanical compression of the foam after extrusion.

The foams of this invention are useful for sound absorption and sound insulation. The foam is characterized by having an open-cell content of greater than 50% and a cell size of greater than 1 millimeter. Preferably, the foam has at least 70% open-cells, a cell size of at least 1.5 millimeters, and a compressive strength less than 30 kPa at 10% deflection. The foam preferably has a sound absorption coefficient at 1,000 Hz which is greater than 0.15, preferably greater than 0.2. The foams of this invention can be made in any cross-sectional size or configuration, and are particularly useful in making foam sheet. For use as a sound absorber, the foam is preferably perforated at a hole density greater than one hole per ten square centimeter, preferably greater than one hole per five square centimeter and most preferably greater than one hole per square centimeter. For use as a decoupler, the foam is pre-compressed more than 50%, and preferably more than 80%, so that the compressive strength at 10% deflection is less than 30 kPa, preferably less than 20 kPa, and most preferably less than 10 kPa.

Preferred foams of this invention for sound management end-uses have airflow resistivities of less than about 800,000 Rayls/m (that is, 800,000 Pa s/m$^2$) is desirable, with less than 400,000 Ralys/m (that is, 400,000 Pa s/m$^2$), less than 100,000 Rayls/m (that is, 100,000 Pa s/m$^2$), and less than 50,000 Rayls/m (that is, 50,000 Pa s/m$^2$) being increasingly more desirable depending upon the end-use of the foam.

Figure 7:
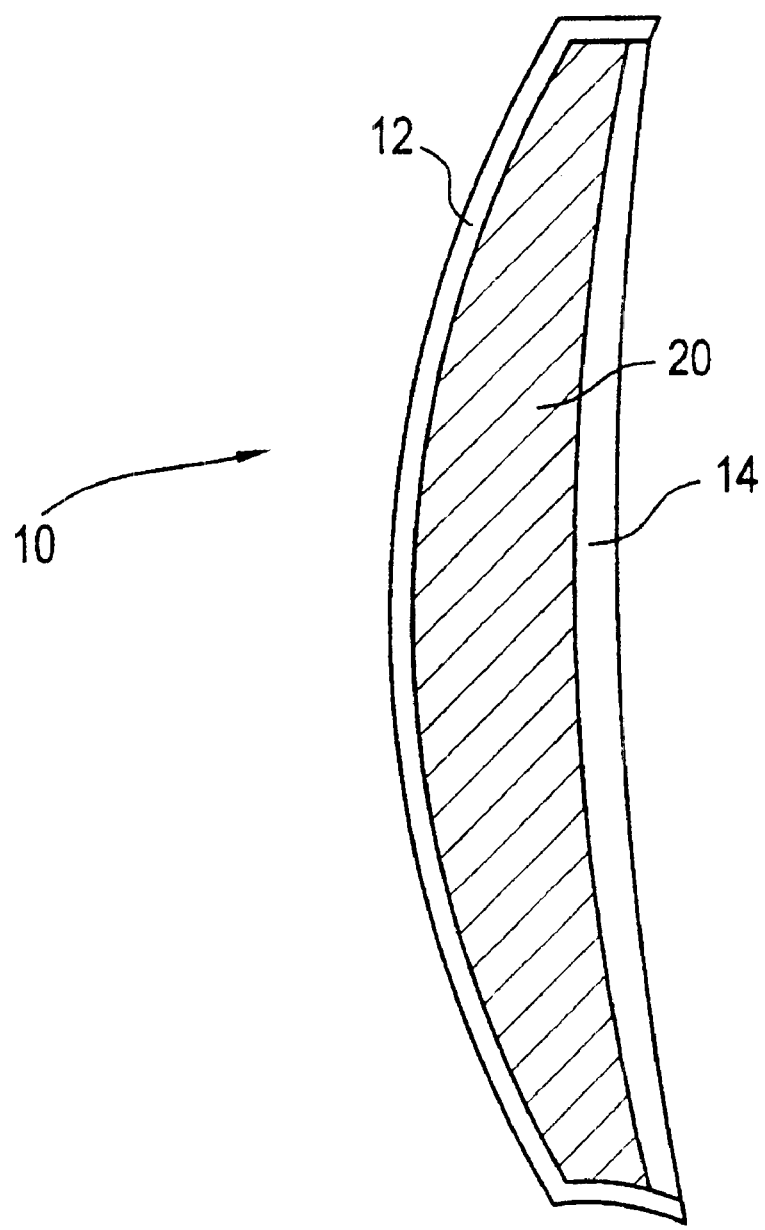
FIG. 7 is a schematic cross-sectional representation of a sound insulating panel.

Shown in FIG. 7 is a cross-sectional view of a sound insulation panel 10, such as a sound insulated automobile door panel, comprising a first skin layer 12, a second skin layer 14, and a sound insulating insert 20. Sound insulating insert 20 is a foam sheet in accordance with the invention having an open-cell content of at least 50%, a cell size of at least 1 millimeter, wherein the foam is prepared from a linear or modified linear polyolefin or a blend comprising a linear or modified linear polyolefin. Foam insert 20 desirably has a low dynamic stiffness in order to effectively reducing the transmission of sound or vibration through the structure. For example, one of the skin layers 12 may be a sheet metal, and the other skin layer 14 may be a heavy layer or barrier layer comprising highly-filled ethylene vinyl acetate or a thermoplastic elastomer. Panel 20 may act as a sound absorber, sound deadener, or sound/vibration decoupler. Presently, open-cell polyurethane foam or fiber batts are commonly used as decouplers. Polyurethane foam is not readily recyclable and is unsuitable for use in a moist environment.

The specific working examples that follow are intended to illustrate the invention, but are not to be taken as limiting the scope thereof. In the examples, parts and percentages are by weight unless otherwise specified or required by the content.

EXAMPLE 1

The equipment used in this example is a 38 mm (1 ½ inch) screw type extruder having additional zones of mixing and cooling at the end of the usual sequential zones of feeding, metering, and mixing. An opening for blowing agent is provided on the extruder barrel between the metering and mixing zones. At the end of the cooling zone, there is attached a die orifice having an opening of rectangular shape. The height of the opening, hereinafter called the die gap, is adjustable while its width is fixed at 6.35 mm (0.25 inch).

In this example, open-cell foams were extruded from a high-melt strength (HMS) polypropylene resin blended with a polyolefin elastomer (POE) resin.

The resin blend was a 50/50 by weight blend of a HMS 96.8/3.2 propylene/ethylene copolymer resin having a melt flow rate (MFR, determined per ASTM 1238 at 230° C./2.16 kg) of approximately 2 and a conventional polypropylene homopolymer resin having approximately 0.3 MFR. The HMS polypropylene resin had a MFR of approximately 0.6. The POE resin was a Dow ENGAGE® resin EG 8150 having 0.870 g/cm$^3$ density and 0.5 melt index per ASTM D1235 at 190° C./2.16 kg. The POE resin was prepared using an INSITE® technology catalyst (constrained geometry catalyst).

In practice, granular polyolefin resins were preblended at a predetermined ratio and with an antioxidant package and a small amount of talcum powder for cell size control. The level of talcum powder was 0.015 parts per one hundred parts of polymer (pph). The antioxidant package consisted of 0.1 pph each of Irganox® 1010 brand hindered phenol type antioxidant obtained from Ceiba-Geigy Corporation and Ultranox® 626 brand phosphite type antioxidant obtained from General Electric Company. The antioxidants had been compounded into concentrate forms in a polyethylene resin at about a 10% level. The solid mixture was then fed into the hopper of the extruder and extruded at a uniform rate of 5.44 kgs/hr (12 lbs/hr). The temperatures maintained at the extruder zones were 188° C. at the feeding zone, 196° C. at the transition zone, 210° C. at the melting zone, 216° C. at the metering zone and 213° C. at the mixing zone. Isobutane was injected into the injection port at a uniform rate so that the blowing agent level became approximately 1.7 g-moles per kilogram of polymer. The temperature of the cooling zone was gradually reduced to cool the polymer/blowing agent mixture (gel) to an optimum foaming temperature for each formulation to produce a good open-cell foam. The foaming temperature was 154° C. for Test 1.2 and 1.3. the die temperature was maintained at approximately the same temperature as the foaming gel temperature. The die opening was adjusted to achieve a good foam strand free from prefoaming.

At a die opening size of approximately 0.9 mm, good foams having approximately 34 mm in width and 11 mm in thickness were achieved. As shown in Table 1, the foams had low densities and a substantially open-cell structure, with open-cell contents higher than 75%. The cell sizes of the foams determined in the horizontal direction were relatively large ranging from 1.6 mm to 2.3 mm. Approximately a month after extrusion, the foams were subjected to other tests: determination of heat distortion temperature, tensile strength, and compressive strength.

Physical and Mechanical Properties of the Foams

The test results are summarized in Table 1. The heat distortion temperatures of the PP/POE blend foams are 20° C. lower than that of the PP foam (150° C.) but high enough for a number of applications that include automotive uses. The POE resin had desirable effects on the physical properties of the foams. The POE resin made the foam tougher and softer. The PP/POE blend foams were elongatable more than two times as much as the PP foam. As anticipated from the low modulus of the POE resin, the PP/POE blend foams had significantly lower compressive strengths than the PP foam. During the first compression tests, the foam speci Table 1, the foams were softened during the initial compression. The compressive strengths at 10% deflection were shown to be reduced by as much as seven-fold. A low compressive strength at a small deflection or a low compressive modulus is desired for sound insulation materials.

strands. The foam specimens were subjected to the ASTM E 1050 acoustic absorption test. The sound absorption coefficients were measured as a function of frequency for two specimens per foam. The averages of two test results were calculated and presented in FIG. 1. In addition, the sound

TABLE 1

Processability and Strength Properties of PP Blend Foams

| Test | Polymer Type (1) | Foam Density (kg/m3) (2) | Cell Size (mm) (3) | Open Cell (%) (4) | Heat Distort. Temp. (5) | Tensile Streng. (kPa) (6) | Elong. (%) (7) | No. Comp (8) | Compress. Strength | | |
|---|---|---|---|---|---|---|---|---|---|---|---|
| | | | | | | | | | 10% (kPa) | 25% (kPa) (9) | 50% (kPa) |
| 1.1 | PP | 23 | 2.0 | 85 | 150 | 200 | 38 | 1 | 26 | 44 | 52 |
| | After mechanical compression | | | | | | | 2 | 5 | 13 | 29 |
| 1.2 | PP/POE: 70/30 | 21 | 2.3 | 75 | 130 | 202 | 85 | 1 | 22 | 23 | 33 |
| | After mechanical compression | | | | | | | 2 | 3 | 7 | 14 |
| 1.3 | PP/POE: 60/40 | 23 | 1.6 | 82 | 130 | 300 | 98 | 1 | 13 | 17 | 22 |
| | After mechanical compression | | | | | | | 2 | 6 | 8 | 13 |

Notes:
(1) POE = ENGAGE EG-8150 brand ethylene/octene copolymer made by Dow.
(2) The density of foam body aged for about 4 weeks in kilograms per cubic meter.
(3) The cell size in millimeters determined per ASTM D 3576.
(4) The open cell content of the foam body in percent determined per ASTM D 2856-A.
(5) The maximum temperature where the foam body shrinks no more than 5% in volume during one hour exposure in degrees Celsius.
(6) Tensile strength in the extrusion direction in kiloPascals determined per ASTM D 3575.
(7) Tensile elongation in the extrusion direction in percent determined per ASTM D 3575.
(8) Number of compression; 1 = first compression, 2 = second compression.
(9) Compressive strength in the vertical direction at the specified deflection (%) in kiloPascals determined per ASTM D 3575.

Acoustical Properties of Foams Prepared In Example 1

Selected foams made in Example 1 were tested from their sound absorption capability. The PP foam and 60/40 PP/POE foams were selected. The 12.7 mm-thick test specimens were prepared by skiving and thermally joining the foam strands.

absorption data at selected frequencies are given in Table 2 along with those for foams prepared in Example 2 and counter examples. The foams were shown to absorb the sound energy reasonably well. The PP/POE blend foam absorbed the sound better than the PP foam for most of the frequency range.

TABLE 2

Sound Absorption Coefficient of Open-Cell Polyolefin Plank Products

| Test No. | Foam Type | Cell Size (mm) (1) | Specimen Prep. (2) | Open Cell (%) (3) | Thick (mm) (4) | Sound Absorption Coefficient at (H$_2$O) | | | | |
|---|---|---|---|---|---|---|---|---|---|---|
| | | | | | | 250 | 500 | 1000 | 2000 | 4000 |
| | | | | | | | | (5) | | |
| 1.1 | PP | 2.0 | E | 85 | 12.7 | 0.08 | 0.11 | 0.17 | 0.32 | 0.46 |
| 1.3 | PP/POE | 1.6 | E | 82 | 12.7 | 0.10 | 0.18 | 0.29 | 0.34 | 0.68 |
| 2 | LDPE/LLDPE | 1.2 | E | 89 | 12.7 | 0.07 | 0.11 | 0.20 | 0.24 | 0.64 |
| | | | C | 90 | 12.7 | 0.08 | 0.07 | 0.09 | 0.17 | 0.55 |
| C1 | PP | 0.9 | E | 35 | 12.7 | 0.07 | 0.06 | 0.07 | 0.12 | 0.19 |
| | | | C | 95 | 12.7 | 0.07 | 0.06 | 0.07 | 0.11 | 0.16 |
| C2 | PP | 0.6 | E | 69 | 25.4 | 0.06 | 0.05 | 0.06 | 0.10 | 0.20 |
| | Strand | | C | 94 | 25.4 | 0.03 | 0.04 | 0.05 | 0.11 | 0.54 |

Notes:
(1) Cell size determined per ASTM D3576 in millimeters.
(2) E = tested as extruded; C = compressed by 90%, let recovered and tested.
(3) Open cell content of the foam body determined per ASTM D2856-A in percent.
(4) Thickness of the foam specimen (as extruded) in millimeters.
(5) Sound absorption coefficient at the given frequency determined per ASTM D 1050.

EXAMPLE 2

The foaming apparatus used in this example was 89 mm (3 ½ inch)-screw-type extruder having essentially the same configuration as the one used in Example 1. A gap-adjustable slit die of 57.2 mm (2.25 inch) was installed on the apparatus.

In practice, a 50/50 blend of a linear low density polyethylene (Dowlex 2038 brand made by The Dow Chemical Company, 1.0 melt index and 0.935 g/cm$^3$ density) and a low density branched polyethylene (0.923 g/cm3 density and 0.7 melt index) were fed into the extruder at a uniform rate of approximately 113.5 kg/h (250 lb/h). In addition, there were fed in 1.2 pph of stearyl stearamide and 0.025 pph dibutyltindilaurate in concentrate forms along with the polymers. Stearyl stearamide was added to enhance foam dimensional stability and dibutyltindilaurate was added to catalyze the silane cross-linking reaction. The extruder feeding, transition, melting and metering zones were set at 150 to 200° C. so that the polymer was uniformly melted and extruded. Into the mixing zone which was maintained at 230° C., there was injected CFC-12 blowing agent at a rate of approximately 20 pph. Into the blowing agent injection stream, there was injected an azidofunctional silane (Az-Cup MC 98 brand supplied by Hercules Corporation) at a rate of 0.2 pph. The gel was cooled down to an optimum foaming temperature by adjusting the cooling zone temperature. At a gel temperature of approximately 115° C., a good open-cell foam was achieved.

At a die opening which was adjusted to prevent prefoaming, a good foam of approximately 30 mm in thickness and 200 mm in width was obtained. The foam had a density of about 27 kg/m3, a cell size of 1.2 mm, and an open-cell content of 89%. The foam was soft with a compressive strength at 25% deflection of about 25 kPa. The extruded plank was sliced into 12.7 mm (0.5 inch)-thick sheets, and subjected to a compressive test by passing the sheets through two driven rolls whose gap was adjusted to be about 10% of the foam thickness. The compressed foam had an open-cell content of 90% and a compressive strength of a 25% deflection of 16 kPa. Development of additional open cells was minimal since the foam already had a high level of open cells as extruded.

Figure 2:
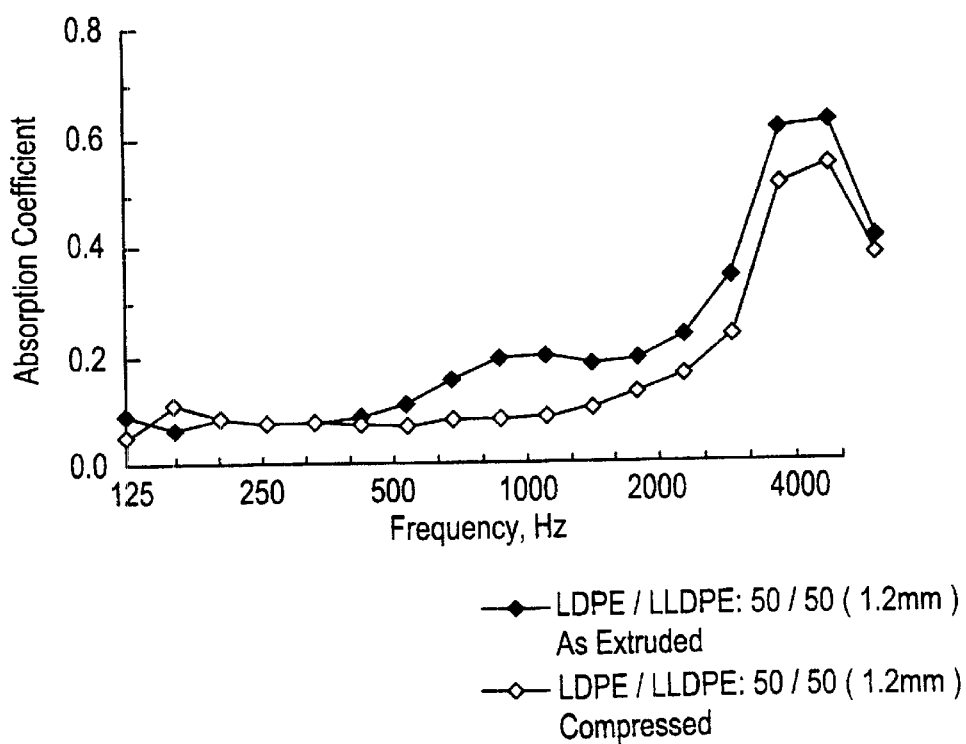

Both the as-extruded and compressed foam specimens were subjected to the ASTM E 1050 acoustic absorption test. As presented in FIG. 2 and Table 2, both foam specimens absorb the acoustic energy reasonably well at medium to high frequencies. As far as sound absorption is concerned, compression of the foam provides no improvement in the performance. However, the compression-softened foam is anticipated to have a lower dynamic stiffness, which will result in an improved sound insulation performance, for example, against impact sounds.

COMPARATIVE EXAMPLE 1

The foaming apparatus used in this example is the same as employed in Example 2 except for the die orifice. The die has the same configuration as used in Example 2 but has a narrower width of 25.4 mm (1 inch).

In the test of this example, a high melt strength (HMS) 2/98:ethylene/propylene random copolymer having 0.43 melt flow rate (ASTM D 1238 at 230° C./2.16 kg) was employed for foam expansion. In practice, the granular polypropylene was fed into the extruder at a uniform rate of approximately 136 kg/h (300 lb/h). In addition, there were fed in a small amount of talcum powder (0.1 pph) for cell size control and antioxidant concentrates so that the levels of each of the antioxidant components, Irganox® 1010 (Ceiba-Geigy Corp.) and Ultranox® 626 (General Electric Co.), was 0.1 pph. The temperatures maintained at the extruder zones were approximately 130° C. at the feed zone, 200° C. at the melt zone, 230° C. at the metering zone and 210° C. at the mixing zone.

HCFC-142b was injected under pressure into the mixing zone at a rate of 1.5 g-moles per kilogram of polymer. The polymer/blowing agent mixture was uniformly cooled down to an optimum foaming temperature of approximately 154° C., and the die gap was adjusted to prepare a foam free from performing. At a die gap of 2.2 mm (0.088 inch), a good foam having a thickness of 43 mm and a width of 123 mm was achieved.

The foam was dimensionally stable during aging at ambient temperature (about 20° C.–25° C.). When fully aged for over a month, the foam had a density of 24.2 kg/m$^3$ (1.51 pcf), a cell size of 0.9 mm, and an open cell content of 35%. The foam was skived into approximately 12.7 mm thick sheets. Some of the sheets were compressed by 90% of the thickness by the method described in Example 2. The compression broke the cells. The open cell content of the foam increased to 95% and its compressive strength at 25% deflection decreased from about 84 kPa to 26 kPa.

Figure 3:
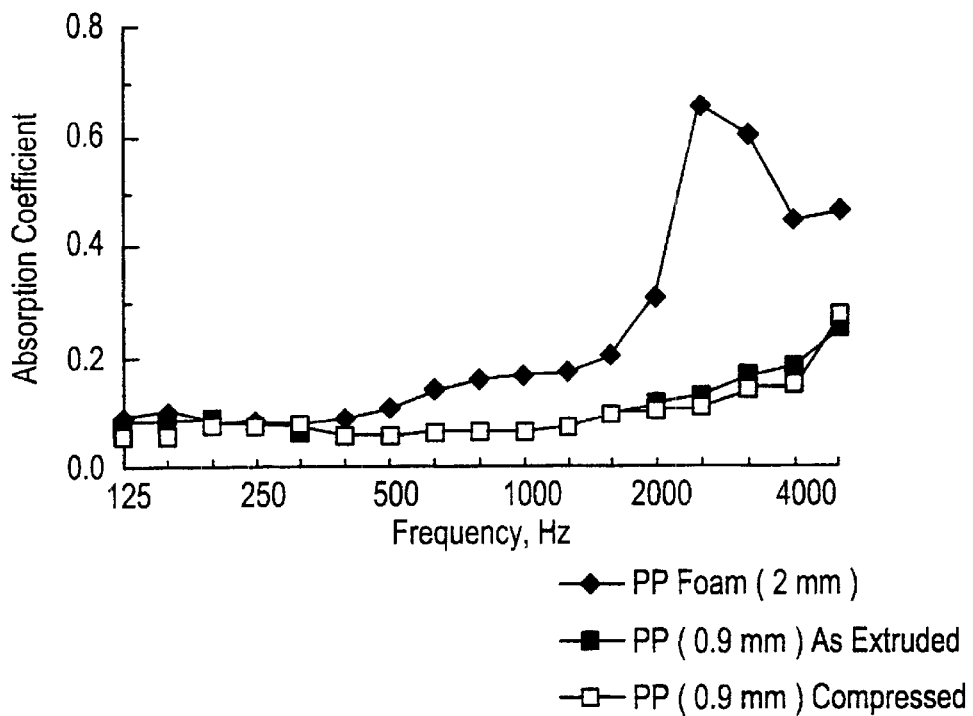

Both the as-extruded foam and the compressed foam sheets were subjected to the ASTM E 1050 acoustic absorption test. As shown in FIG. 3 and Table 2, both foams, independent of their open cell contents, were shown to be poor absorbers of sound energy. The foams having a 0.9 mm cell size are markedly inferior to the foam made in Test 1.1 which has a 2 mm cell size. Compression has little affect on the acoustic performance of the foam, even though the open cell content increased to 95%.

COUNTER EXAMPLE 2

The apparatus used in this example is the same as used in Example 3 except for the die orifice. The apparatus is equipped with a multi-hole die having 2016 holes of 0.041 inch diameter arranged in 18 rows and 112 columns in a equilateral triangular pattern with 0.25 inch distance between holes. The operating procedure of this apparatus is essentially the same as one used in Example 3.

In practice, the test of this example was carried out with an HMS 2/98 ethylene/propylene random copolymer having a melt flow rate of 0.34 (ASTM D1238 at 230° C./2.16 kg). the granular resin was mixed with a small amount (0.05 pph) of talcum powder for cell size control and 0.2 pph antioxidants. The antioxidants consisted of 50% Irganox® 1010 brand hindered phenol-type antioxidant (Ciba-Geigy Corp.) and 50% Ultranox® brand (Borg-Warner Chemical, Inc.) phosphite-type antioxidant. The antioxidants had been precompounded into master batches in the base resin. The solid mixture was fed into the extruder at a uniform rate of approximately 181 kg/h (400 lb/h). The temperatures maintained at the extruder zones were 130° C. at the feed zone, 200° C. at the melt zone, 230° C. at the metering zone and 210° C. at the mixing zone. HCFC-142b was injected under pressure into the mixing zone at a rate of 35.8 kg/h (79 lb/h) which amounts to 19.8 pph or approximately 2.0 g-moles/kg or polymer. The homogeneous mixture of polymer and blowing agent was cooled down to approximately 154° C., and a good foam having a fine cell size was achieved. The foam strands were well coalesced together resulting in a foam plank with most of the interstices filled. The foam cross-sectional size was approximately 61 mm×605 mm.

Figure 4:
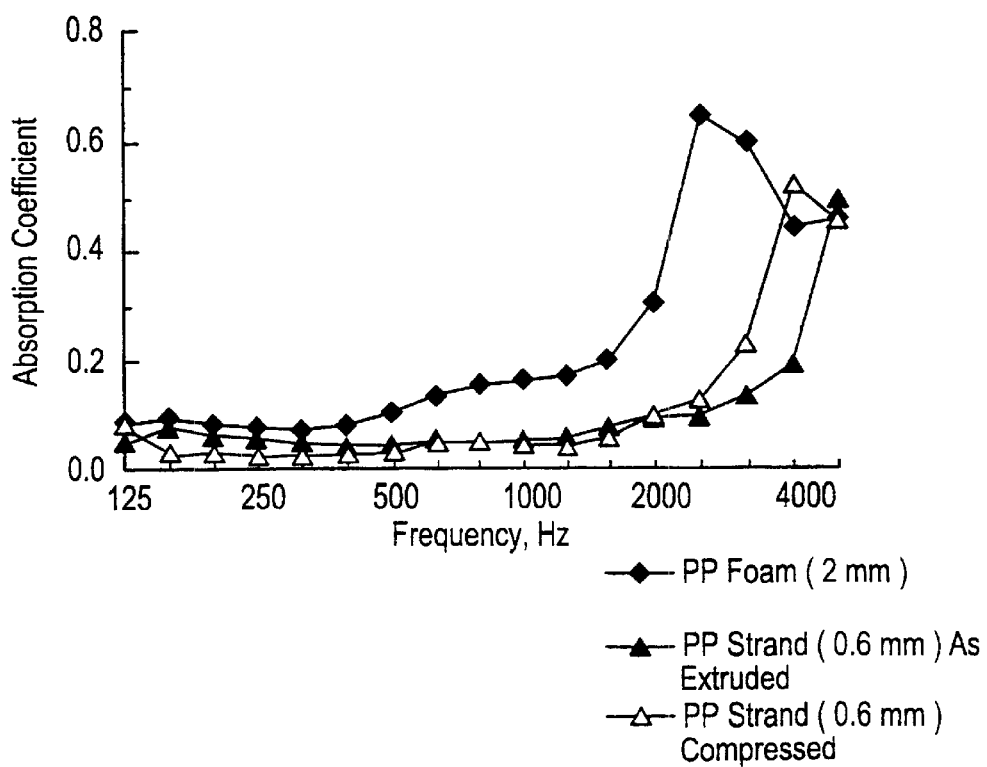

The foam exhibited excellent dimensional stability during aging suffering almost no change (less than 1%) in dimensions. Properties of the foam were determined two weeks after extrusion. The foam had a density of 23.7 kg/m3, a cell size of 0.58 mm, and 69% open cells. The foam had a vertical compressive strength of approximately 49 kPa at 25% deflection. The foam plank was skived to 25.4 mm thick sheet and compressed by 90% per the method described in Example 2. The compressed foam specimen had a higher open cell content of 94% and a lower compressive strength of 17 kPa than the as-extruded foam. The 25.4 mm-thick foam specimens were tested for their acoustic absorption performance. As shown in FIG. 4 and Table 2, the foam specimens, independent of the open-cell content, exhibited unsatisfactory sound absorption performance. Even though the foam specimens were twice as thick as the foam made in Test 1.1, the sound absorption capabilities of the foams were far inferior to that of the Test 1.1 foam.

TABLE 2a

Sound Absorption Coefficient of Foam Sheet Made from PP/POE:70/30 Blend

| Freq. | Sample 1a<br>4 mm sheet as extru | Sample 1a<br>hole punched<br>mm sheet perfor: | Sample 7<br>10 mm sheet | Sample 7<br>hole punched<br>10 mm sheet perforated |
|---|---|---|---|---|
| 100 | 0.02 | 0.02 | 0.03 | 0.03 |
| 125 | 0.02 | 0.02 | 0.03 | 0.03 |
| 160 | 0.04 | 0.02 | 0.03 | 0.06 |
| 200 | 0.06 | 0.03 | 0.04 | 0.07 |
| 250 | 0.07 | 0.04 | 0.06 | 0.09 |
| 315 | 0.09 | 0.05 | 0.09 | 0.13 |
| 400 | 0.11 | 0.06 | 0.11 | 0.18 |
| 500 | 0.14 | 0.07 | 0.15 | 0.27 |
| 630 | 0.18 | 0.11 | 0.19 | 0.36 |
| 800 | 0.23 | 0.17 | 0.24 | 0.40 |
| 1000 | 0.25 | 0.26 | 0.28 | 0.38 |
| 1250 | 0.28 | 0.41 | 0.31 | 0.37 |
| 1600 | 0.29 | 0.41 | 0.32 | 0.45 |
| 2000 | 0.40 | 0.48 | 0.36 | 0.57 |
| 2500 | 0.78 | 0.82 | 0.52 | 0.71 |
| 3150 | 0.87 | 0.95 | 0.87 | 0.74 |
| 4000 | 0.58 | 0.72 | 0.73 | 0.58 |
| 5000 | 0.53 | 0.61 | 0.51 | 0.41 |

EXAMPLE 3

The foaming apparatus used in this example was the same as used in Example 2 except for the die orifice. Instead of a slit die, there is installed an annular sheet die and an associated sizing mandrel. The diameter of the annular orifice is 50.8 mm (2 inch) and the gap of the annulus is adjustable. The sizing mandrel attached to the die orifice has a diameter of 210 mm (8.25 inch).

In this example, open-cell sheet foams were prepared from a polymer resin blend as used in Test 1.2, Example 1, a 70/30 blend of a HMS polypropylene resin and a POE resin. Foam sheet of approximately 5 mm thickness was aimed at in Test 3.1 and one of approximately 10 mm in Test 3.2.

In practice, the granular blend of the polypropylene and POE resins were fed into the extruder at a uniform rate of 136 kg/h (300 lb/h) in Test 1.1, 182 kg/h (400 lb/h) in Test 3.2. Additionally, there were fed in 0.03 pph of talcum powder and 0.25 pph or antioxidants that were used in Example 1. The temperatures maintained at the extruder zones were approximately 130° C. at the feed zone, 200° C. at the melt zone, 225° C. at the metering zone and 195° C. at the mixing zone.

Isobutane was injected into the mixing zone at a rate to become 10 pph (1.72 g-moles per kilogram of polymer). The temperatures of the cooling zone and the die were reduced so that good open-cell foams could be produced. The temperatures were 158° C. and 156° C. in Test 3.1 and 154° C. and 156° C. in Test 3.2. The gap of the annular orifice was adjusted to provide foams free from prefoaming. The foaming gel was pulled over the sizing mandel to form a tubular foam sheet. The tubular sheet was slit into a flat sheet and conducted away through a set of pull rolls and wound into a roll. The thickness of the foam sheet was adjusted by the die gap and the take-away speed. The take-away speed was approximately 23 meter per minute in Test 3.1 and 20 meter per minute in Test 3.2. A good-quality foam sheet of a high open-cell content was achieved in both tests.

The foams were tested for physical and mechanical properties and then subjected to sound absorption tests. The sound absorption tests were conducted using an impedance tube per ASTM E 1050 with specimens both as extruded and after perforation. Holes were pierced through the sheet with a 2 mm-diameter needle at 10 mm×10 mm square pattern.

Physical and Mechanical Properties of Sheet Foams

The properties of the sheet foams produced in this example are set forth in Table 3. The sheet foams contain high open cells and have high heat distortion temperatures. The compressive strengths of the foams are low resembling those foams gone through the compression in Example 1. The low compressive strengths are attributed to both the cell orientation in the extrusion direction and a partial compression that foams experienced during their transit though the pull rolls. Such a low-modulus open-cell foams having a high heat distortion temperature is useful for automotive sound deadening. The sheet foams, for example, may be used for a decoupling insert between sheet metal and a heavy layer.

TABLE 3

Physical and Mechanical Properties of PP/POE Blend Foam Sheet

| Test<br>No. | Sheet<br>Thick.<br>(mm)<br>(1) | Sheet<br>Width<br>(mm)<br>(2) | Foam<br>Density<br>(kg/m3)<br>(3) | Cell<br>Size<br>(mm)<br>(4) | Open<br>Cell<br>(%)<br>(5) | Heat<br>Distort.<br>Temp.<br>(6) | Compress.<br>Strength<br>(kPa)<br>(7) |
|---|---|---|---|---|---|---|---|
| 3.1 | 4.4 | 580 | 29 | 1.9 | 88 | 120 | 9 |
| 3.2 | 10.2 | 660 | 23 | 2.5 | 83 | 130 | 14 |

Notes:
(1) Thickness of aged foam body in millimeters.
(2) Width of aged foam body in millimeters.
(3) Density of aged foam in kilograms per cubic meter.
(4) Cell size in millimeters determined per ASTM D3576.
(5) Open cell content of the foam body in percent determined per ASTM d2856-A.
(6) Maximum temperature where the foam body shrinks no more than 5% in volume during one hour exposure in degrees Celsius.
(7) Compressive strength in the vertical direction at 40% deflection in kiloPascals.

Acoustical Properties of Sheet Foams

Figure 5:
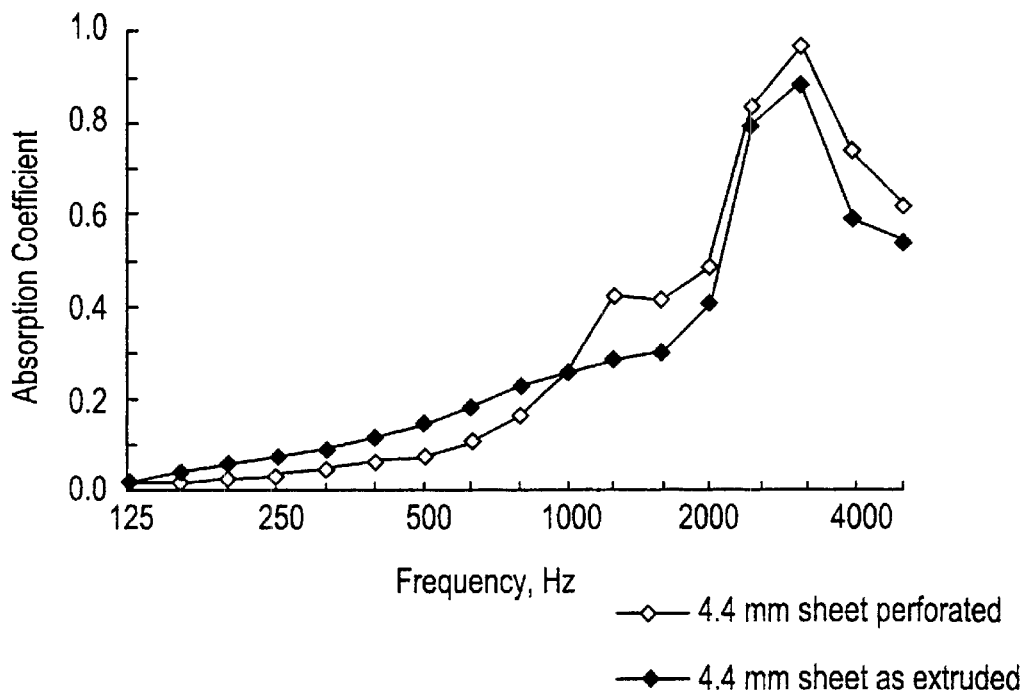
Figure 6:
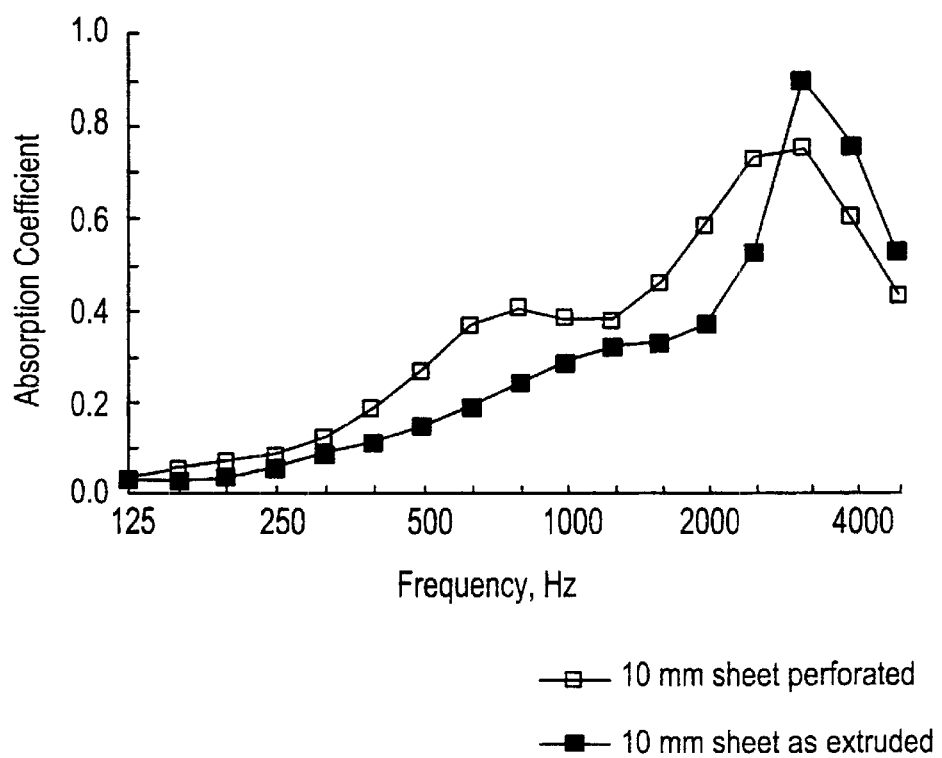

The sound absorption properties of the sheet foams are summarized in Table 4 and FIGS. 5 and 6. At medium and high frequencies, the sheet foams absorb sound well. Perforation generally enhances sound absorption by the sheet foams. Such a sound absorption performance by a relatively thin material is satisfactory.

TABLE 4

Sound Absorption Coefficient of Open-Cell Polyolefin Foam Sheet Products

| Test No. | Specimen Preparation (1) | Sound Absorption Coefficient at Frequency (Hz) | | | | |
|---|---|---|---|---|---|---|
| | | 250 | 500 | 1000 (2) | 2000 | 4000 |
| 3.1 | E | 0.07 | 0.14 | 0.25 | 0.40 | 0.58 |
|  | P | 0.04 | 0.07 | 0.26 | 0.48 | 0.72 |
| 3.2 | E | 0.06 | 0.15 | 0.28 | 0.36 | 0.73 |
|  | P | 0.09 | 0.27 | 0.38 | 0.57 | 0.58 |

Noted:
(1) E = test as extruded; P = perforated at 10 mm × 10 mm spacing with a 2 mm needle.
(2) Sound absorption coefficient at the given frequency determined per ASTM E 1050.

While embodiments of the foam and the process of the present invention have been shown with regard to specific details, it will be appreciated that depending upon the manufacturing process and the desires of the manufacturer, the present invention may be modified by various changes while still being fairly within the scope of the novel teachings and principles herein set forth.

What is claimed is:

1. An expanded open-cell foam polymer composition comprising at least one linear or modified linear polyolefin wherein the expanded foam has at least 50% open cells determined according to ASTM D2856-A, and an average cell size of at least 1 millimeter determined according to ASTM D3576, wherein the at least one linear or modified linear polyolefin is blended with another polyolefin having a melting point at least 10 degrees Celsius less than that of the linear or modified linear polyolefin.

2. The expanded foam of claim 1, wherein the expanded foam has a compressive strength less than 20 kPa at 10 percent deflection.

3. The expanded foam of claim 1, wherein the composition has an airflow resistivity of less than 800,000 Pa s/m$^2$ (800,000 Rayls/m).

4. The expanded foam of claim 1, wherein the linear or modified linear polyolefin is a homopolymer or a copolymer of propylene and at least one other α-olefin selected from ethylene and $C_4$–$C_{20}$ α-olefins.

5. The expanded foam of claim 1, wherein the linear or modified linear polyolefin is a polypropylene homopolymer, a copolymer of propylene with ethylene and/or ethylene-propylene copolymer.

6. The expanded foam of claim 5, wherein the linear or modified linear polyolefin is high melt strength polypropylene.

7. The expanded foam of claim 1, wherein the linear or modified linear polyolefin is linear low density polyethylene.

8. The expanded foam of claim 1, wherein the linear or modified linear polyolefin is a modified linear polyolefin and the modified linear polyolefin is blended with another polyolefin having a melting point lower than that of the modified linear polyolefin.

9. The expanded foam of claim 2, wherein the other polyolefin is a substantially linear polyolefin.

10. The expanded foam of claim 9, wherein the linear or modified linear polyolefin comprises at least 50 weight-percent of the total polymer weight of the composition.

11. The expanded foam of claim 9, wherein the other polyolefin comprises less than 40 weight percent of the total polymer weight of the composition.

12. The expanded foam of claim 1, wherein the foam has a density less than 160 kilograms per cubic meter.

13. The expanded foam of claim 1, wherein the foam has a density less than 80 kilograms per cubic meter.

14. The expanded foam of claim 1, wherein the foam has a density less than 40 kilograms per cubic meter.

15. The expanded foam of claim 1, wherein the average cell size is at least 1.5 millimeters.

16. The expanded foam of claim 1, wherein the average cell size is at least 2 millimeters.

17. The expanded foam of claim 1, wherein at least 70% of the cells are open determined according to ASTM D2856-A.

18. The expanded foam of claim 1, wherein at least 85% of the cells are open determined according to ASTM D2856-A.

19. The expanded foam of claim 9, wherein the other polyolefins a substantially linear copolymer of ethylene with α-olefin.

20. The expanded foam of claim 1, wherein the foam has been extruded in the form of a sheet.

21. The expanded foam of claim 1, wherein the polymer composition comprises a cross-linked polymer.

22. The expanded foam of claim 21, wherein the cross-linked polymer is the product of an olefinic polymer having pendant carboxylic acid functional groups, pendant hydroxyl functional groups, pendant amino functional groups, pendant amide functional groups, or a combination thereof, with a cross-linking agent selected from the group consisting of epoxy functional silanes, amine functional silanes, organofunctional alkoxy silanes, titanates, multi-epoxy functional resins, and amino cross-linking agents.

23. The expanded foam in claim 21, wherein the cross-linked polymer has been prepared by the use of a free-radical generating compound.

24. The expanded foam of claim 23 wherein free-radical generating compound is an organic peroxide.

25. The expanded foam of claim 23 wherein free-radical generating compound is a multi-azidofunctional compound.

26. The expanded foam of claim 9, 10 or 11 wherein the expanded foam is perforated at a hole density of greater than one hole per five square centimeters.

27. A sound insulation panel comprising two skin layers and a foam sheet disposed between the two skin layers, the foam sheet comprising an expanded foam of claim 1.

28. The panel of claim 27, wherein the expanded foam has a sound absorption coefficient as determined by ASTM D 1050 at 1,000 Hz which is greater than 0.15.

29. A foam sheet comprising the expanded foam of claim 1 having a sound absorption coefficient as determined by ASTM D 1050 at 1,000Hz which is greater than 0.15.

30. A foam sheet comprising the expanded foam of claim 1, wherein the expanded foam has at least 70 percent open cells, a cell size of at least 1.5 mm and a compressive strength less than 30 kPa at 10 percent deflection.

* * * * *